Feb. 13, 1934.  W. A. RIDDELL  1,946,639
FOLDING PROJECTION SCREEN
Filed June 30, 1931
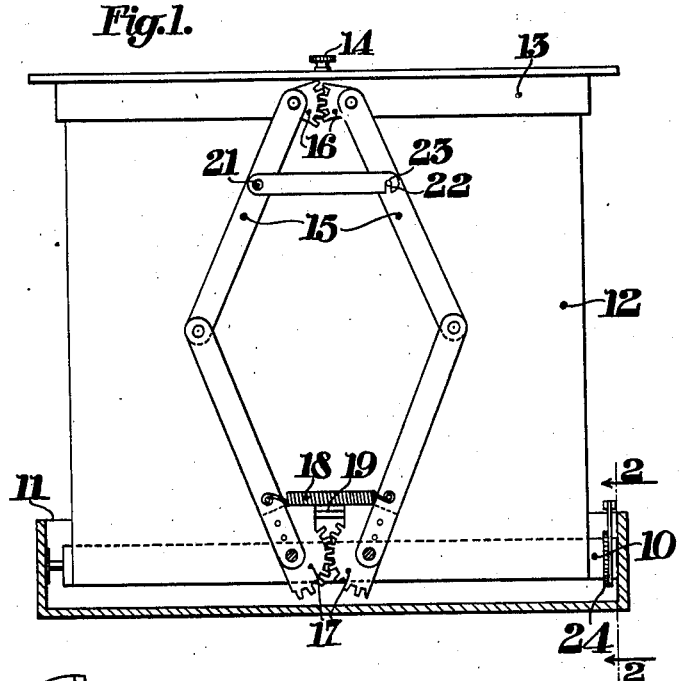
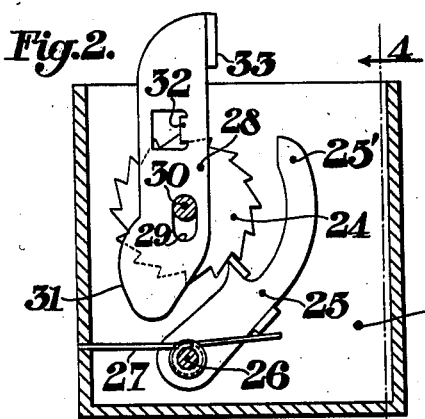
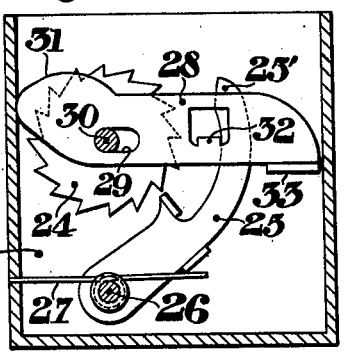
Inventor:
William A. Riddell,
By Newton M. Perrins
George A. Gillette, Jr.
Attorneys Patented Feb. 13, 1934

1,946,639

UNITED STATES PATENT OFFICE 1,946,639

FOLDING PROJECTION SCREEN

William A. Riddell, Rochester, N. Y., assignor to Eastman Kodak Company, Rochester, N. Y., a corporation of New York Application June 30, 1931. Serial No. 547,907

7 Claims. (Cl. 88—24)

The present invention relates to a photographic folding projection screen and more particularly to a folding projection screen which may be readily erected and which may be subsequently tensioned to present a plane surface.

The primary object of the present invention is the provision of an erecting structure for a projection screen which includes a pair of lazy tongs.

Another object of the present invention is the provision of a tensioning device which is adapted to intermittently actuate the spring roller when the erecting means is in upright position.

A further object of the present invention is the provision of a tensioning device including a ratchet means normally preventing further unwinding of screen from the spring roller and including a lever means which actuates the ratchet means in tightening position and which causes disengagement of the pawl in the ratchet means during release position of the lever means.

Still another object of the invention is the combination with an erecting means for a roll screen which is centrally and pivotally connected between the casing and cross bar for the screen, of a tensioning device acting upon the spring roller so that the resiliency in the cross bar for the screen will act to evenly distribute the tension produced by the tightening device throughout the area of the screen.

Other and further objects of the invention will be suggested to those skilled in the art as the particular description of the illustrated embodiment is developed hereinafter.

The aforementioned objects of the invention are embodied in a folding projection screen which broadly comprises a casing, a spring roller with a screen wound thereon mounted in said casing, an erecting structure for the screen which acts centrally between the casing and free end of the screen, and a tensioning device which acts upon the spring roller and which includes a lever means capable of actuating the spring roller to tension the screen in one position, and capable of disengaging a pawl to relieve the screen of tension in the other position of the lever means.

Reference is now made to the accompanying drawing in which like reference numerals designate similar elements, and in which:

Fig. 1 is a rear view of the folding projection screen according to the invention in erected position.

Fig. 2 is a transverse cross section through the casing for the screen taken on the line 2—2 of Fig. 1, and illustrating the position of the various elements in the tensioning device during the tightening position thereof.

Fig. 3 is also a transverse cross section through the casing for the screen but illustrating the elements of the tensioning device in release position.

Fig. 4 is a fragmentary, longitudinal cross section through the casing for the screen taken on the line 4—4 of Fig. 2 and illustrating a front view of the tensioning device in tightening position.

In the illustrated embodiment of my invention a spring roller 10 of known internal construction is rotatably mounted between the ends of an elongated rectangular casing 11. A screen 12 has one end attached to the spring roller 10 and is surfaced with a properly balanced diffusing and reflecting medium for the type of projection work contemplated. A cross bar 13 is attached to the free end of the screen 12 and is provided with a knob 14 to facilitate erection of the screen.

An erecting means which is centrally and pivotally connected between the casing 11 and cross bar 13 includes a pair of lazy tongs and a suitable means for maintaining said lazy tongs in extended position. Specifically the lazy tongs includes a pair of hinged side arms 15 which are pivotally connected at one end to the cross bar 13 near the center thereof and pivotally mounted on the rear side of casing 11, also near the center thereof.

An equalizing means to insure equal movement of the hinged side arms comprises two pairs of intermeshing gear segments 16 and 17. Gear segments 16 are attached to the upper ends of side arms 15 and have their centers coinciding with the pivotal support for the side arms 15 on the cross bar 13. Gear segments 17 are attached to the lower ends of side arms 15 and have their centers coinciding with the pivotal support for the side arms 15 on the rear side of casing 11.

A coil spring 18 is connected between the lower halves of side arms 15 to assist in the extension of the lazy tongs after they have been extended to a predetermined position. In view of the well known toggle action in the lazy tongs the coil spring cannot exert an effective erecting moment after the lazy tongs have been lowered beyond a definite point. A stop 19 is mounted on one of the gear segments 17 to abut the other gear segment 17 and to limit the extension of the lazy tongs by the coil spring 18. It may be desirable to provide a means for maintaining the lazy tongs in extended position, especially if a tensioning device is to be used on the spring roller. Such a means may comprise a strip 20 which is pivoted at 21 on the upper half of one side arm 15 and which is provided with a slot 22 adapted to engage a pin 23 on the other side arm 15 and make the erecting means including the lazy tongs rigid.

The spring within spring roller 10 will act to create tension in the screen 12 but it is well recognized that the action of this tension is not sufficient to maintain the screen in a plane. In the great majority of cases the slack in the screen exists along the side edges thereof so that said edges curl forwardly or rearwardly. Therefore, since the cross bar 13 on the free end of the screen 12 is supported centrally according to the present invention, winding of the spring roller 10 against the action of a rigid erecting structure will create a tension within the screen 12 which will be evenly distributed by virtue of the resiliency in cross bar 13. Furthermore, known tensoning devices acting upon the spring roller have a rigid supporting structure which supports the cross bar at the ends thereof so that winding of the spring roller for tightening purposes will cause stretching of the screen along the side edges to aggravate rather than alleviate the curling condition within the screen.

The tensioning device according to my invention is unusually compact and effective. Said tensioning device comprises a ratchet means which, when operative, allows rotation of the spring roller 10 in one direction only, and also comprises a lever means which performs a dual function, either to advance the spring roller 10 step by step in conjunction with the ratchet means or to cause disengagement of the ratchet means and allow free re-winding of the screen 12 upon the spring roller 10. The ratchet means according to the illustrated embodiment comprises a ratchet wheel 24 attached to one end of spring roller 10 and a pawl 25 which is pivotally mounted within casing 11 by a pivotal support 26 and which is normally held in engagement with ratchet wheel 24 by means of a spring 27. The lever means according to the invention includes a lever 28 which is provided with a slot 29 surrounding the axle 30 of the spring roller 10, has a cam portion 31 which slidably abuts the rear side of casing 11 in released or horizontal position as shown in Fig. 3 to move the lever 28 out of engagement with ratchet wheel 24, and has a laterally projecting lug 32 which engages the ratchet wheel 24 in tightening position and is disengaged therefrom in released position. The lug 32 on lever 28 slidably engages an arcuate extension 25' on pawl 25 as the lever 28 approaches the released or horizontal position. Consequently, in said released position the pawl 25 is maintained against the action of spring 27 out of engagement with ratchet wheel 24. The aforementioned dual function of the lever 28 or, more specifically, the lug 32 thereon, is now quite clear, since the lug 32 engages the ratchet wheel 24 in tightening position to allow step by step movement of spring roller 10 through movement of lever 28 or alternatively in released position the lug 32 holds pawl 25 out of engagement with ratchet wheel 24 to allow free rotation of spring roller 10. A thumb piece 33 may be turned up out of lever 28 to facilitate actuating of said lever 28.

Since many modifications of the present invention should be obvious to those skilled in the projection screen art, the present disclosure is to be construed in an illustrative and not in a limiting sense. The scope of the invention is more particularly defined in the appended claims.

Having now particularly described my invention, what I claim as new and desire to secure by Letters Patent of the United States is:

1. In a folding projection screen, the combination with a casing, a spring roller mounted therein, a screen wound on said roller and a cross-bar attached to the free end of the screen, of a lazy tongs including hinged side arms centrally and pivotally connected between said casing and said cross-bar and intermeshing gear segments on said side arms for equal movement thereof.

2. In a folding projection screen the combination with a casing, a spring roller mounted therein, a screen on said roller and erecting means for holding said screen in erected position, of a tensioning device for said screen including a ratchet means for engaging said roller and a lever means which is manually operable for moving said roller and for disengaging said ratchet means.

3. In a folding projection screen the combination with a casing, a spring roller mounted therein, a screen on said roller and erecting means for holding said screen in erected position, of a tensioning device for said screen including a ratchet wheel attached to said roller, a pawl normally engaging said ratchet wheel and a lever which is manually operable for rotating said ratchet wheel to stretch said screen and for moving said pawl out of engagement with said ratchet wheel.

4. In a folding projection screen the combination with a casing, a spring roller mounted therein, a screen on said roller and erecting means for holding said screen in erected position, of a tensioning device for said screen including a ratchet wheel attached to said roller, a pawl normally engaging said ratchet wheel, a lever slidably mounted and adapted alternatively to engage said ratchet wheel and to move said pawl and a cam portion on said lever adapted to cooperate with said casing for movement of said pawl out of engagement with said ratchet wheel.

5. In a folding projection screen the combination with a casing, a spring roller having an axle mounted in said casing, a screen on said roller and erecting means for holding said screen in erected position, of a tensioning device for said screen including a ratchet wheel on said roller, a pawl normally engaging said ratchet, and a lever provided with a slot encircling said axle, having a lug engaging the ratchet wheel in tightening position and said pawl in released position.

6. In a folding projection screen the combination with a casing, a spring roller having an axle mounted in said casing, a screen on said roller and erecting means for holding said screen in erected position, of a tensioning device for said screen including a ratchet wheel on said roller, a pawl normally engaging said ratchet, and a lever provided with a slot encircling said axle, having a lug engaging the ratchet wheel in tightening position and said pawl in released position having a cam portion engaging said casing to move said pawl out of engagement with the ratchet wheel in released position of the lever.

7. In a folding projection screen the combination with a casing, a spring roller mounted therein, a screen wound on said roller, a cross-bar attached to the free end of the screen and an erecting means centrally and pivotally connected between said casing and said cross-bar, of a tensioning device for winding said roller including a ratchet wheel attached to said roller, a pawl normally engaging said ratchet wheel and a lever having a lug engaging said ratchet wheel in tightening position and moving said pawl out of engagement in released position.

WILLIAM A. RIDDELL.